(12) United States Patent
Emo et al.

(10) Patent No.: US 7,423,828 B2
(45) Date of Patent: Sep. 9, 2008

(54) OFF-TRACK WRITE ERROR RECOVERY

(75) Inventors: Bruce D. Emo, Longmont, CO (US);
Peter S. Harllee, III, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 219 days.

(21) Appl. No.: 11/400,106

(22) Filed: Apr. 6, 2006

(65) Prior Publication Data

US 2007/0236818 A1 Oct. 11, 2007

(51) Int. Cl.
*G11B 19/04* (2006.01)
(52) U.S. Cl. .......................... 360/60; 360/53
(58) Field of Classification Search ................ None
See application file for complete search history.

(56) References Cited

U.S. PATENT DOCUMENTS

| 5,570,244 A | 10/1996 | Wiselogel |
| 5,909,334 A | 6/1999 | Barr et al. |
| 6,185,063 B1 * | 2/2001 | Cameron ................. 360/78.04 |
| 6,310,741 B1 | 10/2001 | Nishida et al. |
| 6,421,197 B1 | 7/2002 | Abdelnour |
| 6,442,705 B1 | 8/2002 | Lamberts |
| 6,657,805 B2 | 12/2003 | Nishida et al. |
| 6,882,489 B1 | 4/2005 | Brunnett et al. |
| 2002/0030915 A1 | 3/2002 | Nishida et al. |
| 2003/0214743 A1 | 11/2003 | Urata |

\* cited by examiner

*Primary Examiner*—Joseph Feild
*Assistant Examiner*—Dan I Davidson
(74) *Attorney, Agent, or Firm*—Fellers, Snider, et al.

(57) ABSTRACT

Method and apparatus for off-track write error recovery. A storage medium is provided with at least first and second tracks, and a write protected status is assigned to the second track to inhibit subsequent writing of data thereto in relation to a position error detected during writing of data to the first track. Preferably, a third track is disposed between the first and second tracks. The position error is preferably characterized as a first position error, and a write fault condition is declared during the writing of data to the first track in relation to a second position error different from the first position error. Data write operations are preferably performed on additional tracks while the write protected status of the second track is maintained. In this way, dual-sided encroachment or other track squeezing effects are reduced.

18 Claims, 5 Drawing Sheets

OFF-TRACK WRITE ERROR RECOVERY

FIELD OF THE INVENTION

The claimed invention relates generally to the field of data storage systems and more particularly, but not by way of limitation, to a method and apparatus for recovering from off-track write errors.

BACKGROUND

Data storage devices are used to access data in a fast and efficient manner. Some types of data storage devices use rotatable storage media, along with one or more data transducers that write data to and subsequently read data from tracks defined on the media surfaces.

When writing data to a particular track, transducer position is often monitored and the writing operation is temporarily suspended if a write fault threshold is exceeded. This helps to reduce the likelihood that the data written to the track will encroach upon, and hence interfere with, data written to an adjacent track.

While operable, continued improvements in data storage device performance, including higher track and data storage densities, lead to a continual need for improvements in the art to enhance data integrity in such devices. It is to these and other improvements that preferred embodiments of the present invention are generally directed.

SUMMARY OF THE INVENTION

Preferred embodiments of the present invention are generally directed to an apparatus and method for off-track write error recovery, such as in a data storage device.

In accordance with preferred embodiments, a storage medium is provided with at least first and second tracks. A write protected status is assigned to the second track to inhibit subsequent writing of data thereto in relation to a position error detected during writing of data to the first track.

Preferably, a third track is disposed on the medium between the first and second tracks. The position error is preferably characterized as a first position error, and a write fault condition is declared during the writing of data to the first track in relation to a second position error different from the first position error.

Data write operations are preferably performed on additional tracks on the medium while the write protected status of the second track is maintained. In this way, dual-sided encroachment or other track squeezing effects are reduced.

In some preferred embodiments, data on a selected track are rewritten, after which the second track is write enabled. In other preferred embodiments, the second track is moved or absorbed into other tracks. In still other preferred embodiments, the tracks are characterized as overlapping tracks so as to be intentionally overlapped by adjacent tracks by a selected amount.

These and various other features and advantages which characterize the claimed invention will become apparent upon reading the following detailed description and upon reviewing the associated drawings.

DETAILED DESCRIPTION

Figure 1:
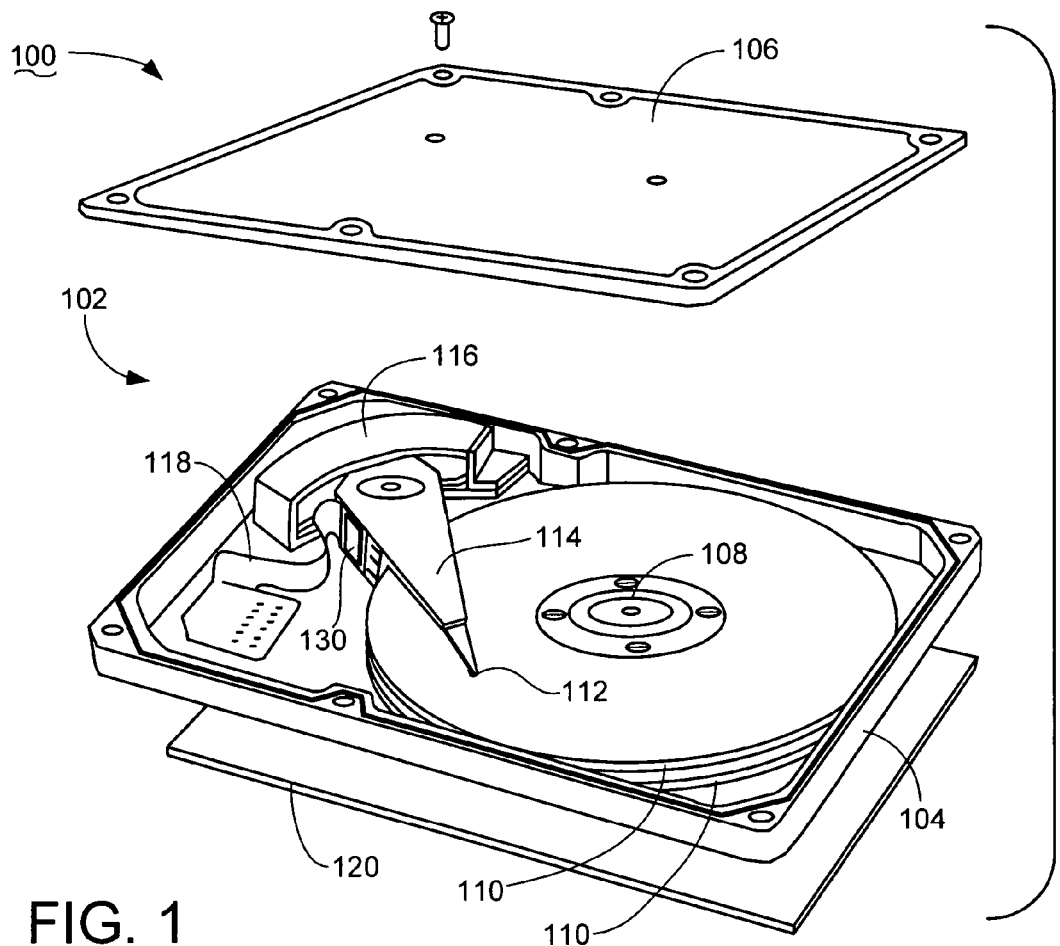
FIG. 1 is an exploded view of a data storage device constructed and operated in accordance with preferred embodiments of the present invention.

FIG. 1 shows an exploded view of a data storage device 100 to provide an exemplary environment in which preferred embodiments of the present invention can be advantageously practiced. The device 100 is preferably characterized as a hard disc drive of the type used to store and retrieve digital data in a computer system or network, consumer device, etc.

The device 100 includes a rigid, environmentally controlled housing 102 formed from a base deck 104 and a top cover 106. A spindle motor 108 is mounted within the housing 102 to rotate a number of data storage media 110 at a relatively high speed.

Data are arranged on the media 110 in concentric tracks which are accessed by a corresponding array of data transducing heads 112. The heads 112 (transducers) are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2:
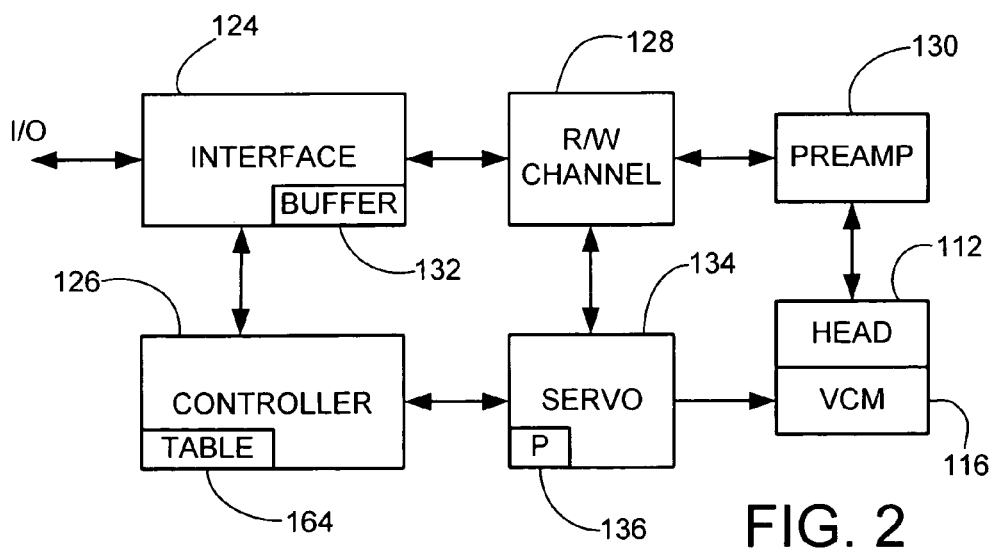
FIG. 2 is a generalized functional block diagram of the device of FIG. 1.

As shown in FIG. 2, the control circuitry preferably includes an interface (I/F) circuit 124 which communicates with a host device using a suitable interface protocol. A top level controller 126 provides top level control for the device 100 and is preferably characterized as a programmable, general purpose processor with suitable programming to direct the operation of the device 100.

A read/write (R/W) channel 128 operates in conjunction with a preamplifier/driver circuit (preamp) 130 to write data to and to recover data from the media 108. A buffer 132 of the I/F circuit 124 temporarily stores data received from the host to be written to the media (write-back data), as well as data recovered from the media prior to transfer to the host (readback data).

A servo circuit 134 provides closed loop positional control for the heads 112. The servo circuit 134 preferably comprises a servo processor 136 (such as a DSP or ARM) and is configured to carry out seek operations to move a selected transducer 112 from an initial track to a destination track, as well as track following operations wherein the selected transducer 112 follows a selected track.

Figure 3:
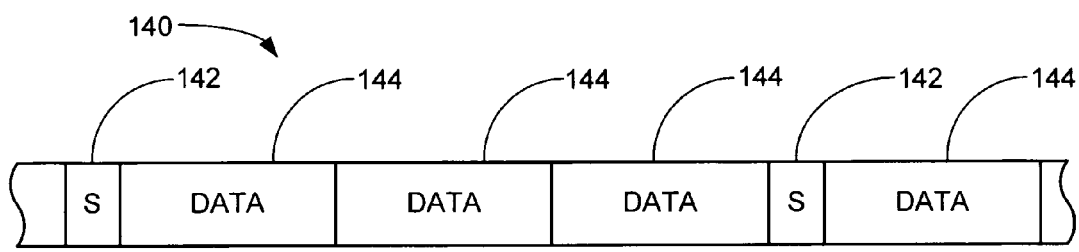
FIG. 3 represents a format for a selected track defined on the device media.

A preferred configuration for each of the tracks on the media 110 is set forth at 140 in FIG. 3. An embedded servo scheme is employed in which radially arranged servo (S) sectors 142 are prewritten during device manufacturing. The servo sectors 142 provide data to the servo circuit 134 including intra-track positional information to permit the servo circuit to determine positional error of the associated transducer 112 during seeking and track following. Data sectors 144 are defined in the spaces between adjacent servo sectors 142, and are each generally configured to store up to a selected amount of user data (e.g., 512 bytes).

The servo data of the servo sectors 142 preferably extend radially across the media surfaces (like spokes of a wheel) and provide di-bit patterns that are used to set the locations of the various data sectors 144 as desired. Thus, reference herein to "tracks" will be understood to refer to the radial alignment of a particular chain of data sectors 144 around the center of the associated medium 110, whether in a discrete ring or along a spiral path.

Figure 4:
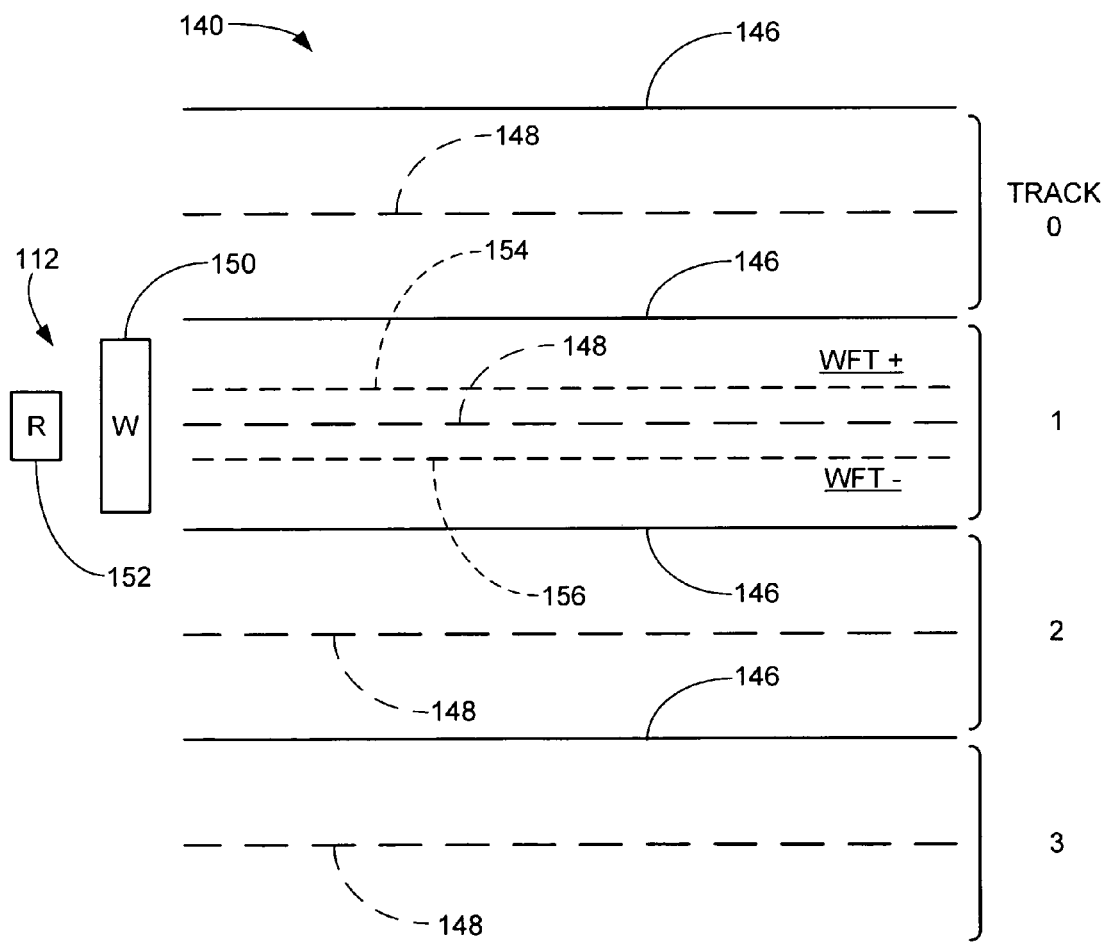
FIG. 4 generally illustrates a number of adjacent data tracks.
Figure 5:
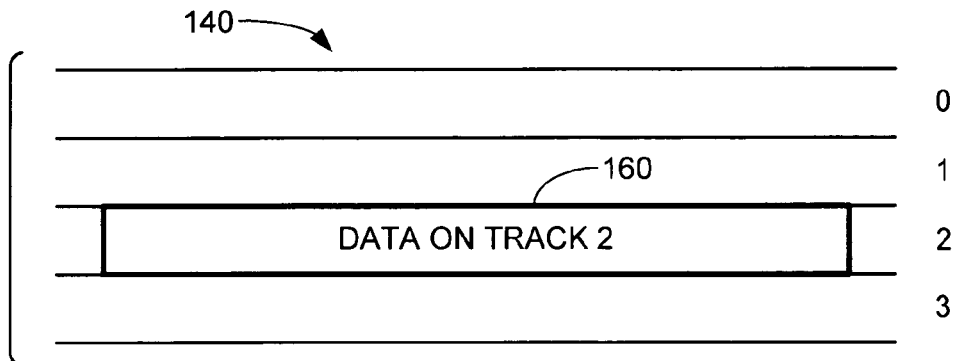
FIGS. 5-8 provide a sequence of actions taken in accordance with preferred embodiments to reduce the adverse effects of position error during writing operations to tracks such as shown in FIG. 4.

FIG. 4 shows data portions of four adjacent tracks arbitrarily denoted as Tracks 0-3. Track boundaries are represented in solid lines at 146, and track centerlines are represented by broken lines at 148.

A selected transducer 112 is shown to be nominally aligned with Track 1. The transducer 112 is contemplated as having a giant magneto-resistive (GMR) construction with separate inductive write element 150 and MR read element 152. Each of these elements has an associated operational width, which may or may not be the same as the corresponding physical width of the element.

While the write and read elements 150, 152 are shown to be radially aligned in FIG. 4, it will be understood that a number of factors, such as head construction and actuator skew angle, will generally tend to place the respective elements at locations that are different from that shown in FIG. 4. During a write operation the servo circuit 134 will generally attempt to obtain a desired alignment of the write element 150 with the selected track (such as the centered alignment of FIG. 4), and the read element 152 may in fact be aligned somewhere else (including aligned with a different track).

Similarly, during a subsequent read operation the read element 152 will generally be aligned by the servo circuit 134 with the associated track such as shown in FIG. 4, irrespective of the location of the write element 150. Since the read element 152 serves as the sensor for both read and write operations, the servo processor 136 preferably uses tables or formulae to determine the necessary offsets for these respective read and write alignments.

During a data write operation to Track 1, the servo circuit 134 will generally attempt to maintain the write element 150 along the associated centerline 148 (or other reference point) of the track. Preferably, a pair of opposing write fault thresholds (WFT±) 154, 156 define a maximum allowable deviation from the centerline (or other reference point) during the write operation. Exemplary values for the WFTs 154, 156 may be on the order of ±15% of the track width.

Generally, if a positional error PE of the transducer 112 exceeds a corresponding WFT 154, 156, a write fault condition is declared and the write operation to the associated track is temporarily suspended. This reduces the likelihood that the writing of data to a selected track, such as Track 1, will result in the overlapping of data previously written to an adjacent track, such as Track 0 or 2.

With reference again to the respective write and read elements 150, 152, it will be noted that the read element 152 may have an effective operation width that is less than the associated effective operational width of the write element 150. In such a case, the overlapping of data on one track by data written to an adjacent track may not present a significant problem in recovering the data to the overwritten track. This can be true even if the amount of overlap is greater than the WFT.

However, this may not necessarily be the case if the overlapped track is overlapped, or encroached, from two directions (i.e., on both sides). If a given track is partially overwritten by both of the immediately adjacent tracks on either side of the given track, there may be insufficient signal strength in the remaining data on the center track to permit successful recovery of the data. Preferred embodiments of the present invention are preferably configured to reduce the effects of such dual-side encroachment, as will now be discussed.

FIGS. 5-8 illustrate a sequence of events carried out by the device 100 in accordance with preferred embodiments. For reference, FIGS. 5-8 are intended to correspond to the four Tracks 0-3 previously shown in FIG. 4.

In this exemplary sequence, data are initially written to at least some number of data sectors (144 in FIG. 3) of Track 2. These data are represented by a "DATA ON TRACK 2" block 160 in FIG. 5. It is contemplated that no data have been written yet to the adjacent tracks 0, 1 and 3, although such is not limiting.

With reference again to FIG. 2, the writing of the data to block 160 is preferably carried out by receipt of the data from the host, the temporary caching of the data in the I/F buffer 132 (FIG. 2), the scheduling of a seek by the servo circuit 134 to move the associated transducer 112 to Track 2, the operation of the R/W channel 128 to encode and serialize the data, and the application of write currents by the preamp 130 in relation to the processed data to selectively magnetize the medium 110 along the selected track.

Figure 6:
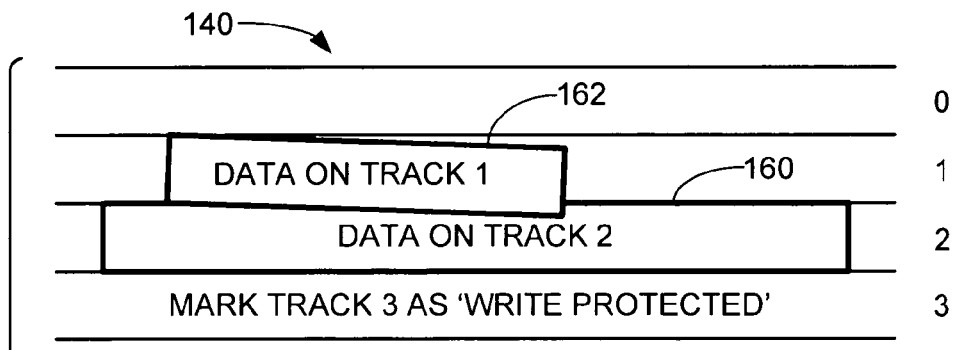

In FIG. 6, a subsequent write operation is commenced to write a second set of data to Track 1. These data are represented in part by a "DATA ON TRACK 1" block 162 and are written in a manner as described above for the data block 160 on Track 2. For purposes of the present example, without limitation Track 1 will also be referred to herein as a "first track."

As shown by the skewed characteristics of block 162 in FIG. 6, it is contemplated that a position error is acquired during the writing of data to the first track so that the data on Track 1 partially overlaps the data of block 160 on Track 2. Although not limiting, it is contemplated that a write fault condition is declared so that the write operation to Track 1 is temporarily suspended before all of the intended data can be written. Nevertheless, it can be seen that at least some encroachment of Track 2 has taken place by the data on Track 1.

At this point, the servo processor 136 preferably operates to set a status of Track 3 as being "WRITE PROTECTED." This serves to inhibit further writes to Track 3 until the overlap condition between Tracks 1 and 2 is successfully resolved. This marking of Track 3 can be carried out in any number of ways, such as setting a status flag in a controller table 164 (FIG. 2). For purposes of the present example, without limitation Track 3 will also be referred to herein as a "second track."

Preferably, the marking of Track 3 with the write protected status applies to all of the data sectors 144 on Track 3. Alternatively, the write protected status can be extended to just those sectors on Track 3 that bound that portion of Track 2 that has been overlapped by the data on Track 1. In the latter case, one preferred approach is to inhibit writing to those data sectors 144 on Track 3 that extend back to the last servo sector 142 at which a non-write fault condition existed during the writing of data to Track 1.

The marking of a track as write protected in this manner is different from a general write fault indication, in that the prohibition is specifically linked to the marked track (or alternatively, the affected sectors thereof). Thus, while the write protected status remains in effect, writing can resume anywhere on the various media except to the marked track (or tracks).

Figure 7:
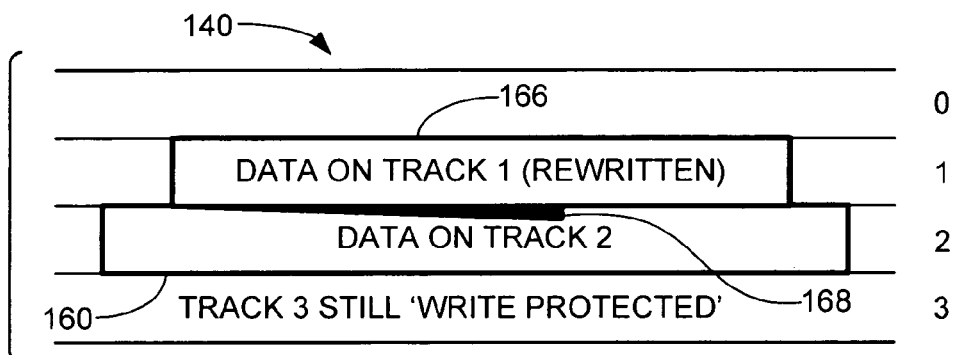
Figure 8:
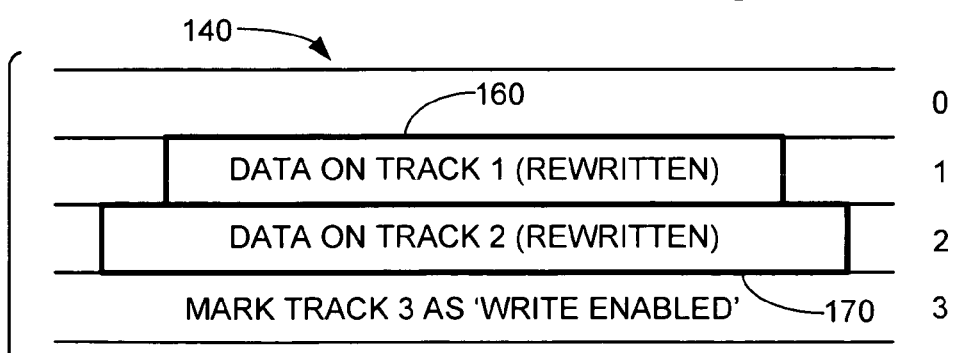

In FIG. 7, one or more latency revolutions of the media 110 are burned to allow the transducer 112 to be correctly aligned with Track 1 and the data are rewritten thereto, as indicated by "DATA ON TRACK 1 (REWRITTEN)" block 166. It is contemplated that the data are retained in the buffer 132 (FIG. 2) to facilitate this rewriting operation. The entire set of data can be rewritten, or the writing can resume at the last known good point prior to the write fault in FIG. 6.

FIG. 7 further shows that at the conclusion of the rewriting of the data to Track 1, a portion of the data on Track 2 is still corrupted, as indicated by shaded area 168 in FIG. 7. As discussed above, the data on Track 2 still may be fully recoverable even in light of this corrupted area 168. However, this may not remain the case if further data corruption takes place from Track 3.

Thus, in some preferred embodiments, no further actions are taken and Track 3 (or the associated portion thereof) retains the write protected status indefinitely, or at least until a new write command is received to write new data to the sectors on Track 2 associated with the area 160. This is one way to ensure that the data integrity of block 160 on Track 2 is maintained.

In other preferred embodiments, a scheduled maintenance action is established at a convenient time, such as during an idle period for the device 100 during which host commands are not being processed. In this approach, the data from block 160 on Track 2 are read and placed into the buffer 132 (FIG. 2). These data are then rewritten to Track 2, such as represented by "DATA ON TRACK 2 (REWRITTEN)" block 170 in FIG. 8. This serves to overwrite, and hence correct, the corrupted area 168 in FIG. 7. Depending upon the extent to which the data in block 160 have been corrupted, reader offsets, adjustments in ECC levels, and other read error recovery techniques may be applied as required to recover this readback data.

Once the data have been rewritten, Track 3 (or the affected portion thereof) is preferably marked with a "WRITE ENABLED" status so that data can now be written thereto. In this way, dual-sided encroachment situations are avoided as before.

In another alternative embodiment related to the foregoing, the scheduled maintenance action results in a normal read operation upon the data on Track 2. If the data are successfully read without errors, or without the need to apply different levels of ECC, etc., then the corruption provided by area 168 may be adjudged as not being particularly significant. In this case, Track 3 may be released (write enabled) without the further step of rewriting the data to Track 2.

While the foregoing discussion triggered the write protected status of Track 3 in response to the declaration of a write fault to Track 1, such is not necessarily required. That is, in alternative embodiments some other quantum of position error by the transducer 112 on the first track can be used to set the write protected status on the second track, including a position error that is less than or more than an associated write fault threshold (e.g., 154, 156). It is contemplated that the amount of position error on the first track selected to trigger the write protected status of the second track may vary depending on the requirements of a given application.

The foregoing embodiments can also be employed with schemes that use intentionally overlapped tracks. In an alternative embodiment shown by FIG. 9, at least a portion of the media recording surfaces employs overlapped tracks such as disclosed by U.S. Pat. No. 6,185,063 to Cameron.

Figure 9:
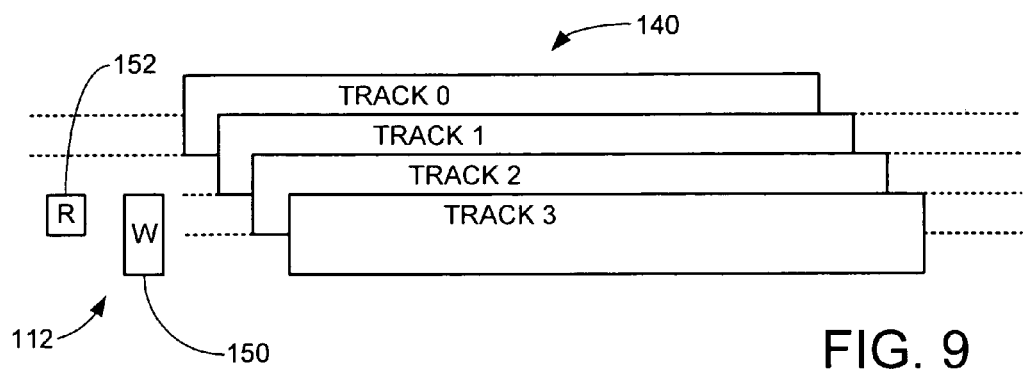
FIG. 9 shows an alternative configuration of tracks of the device of FIG. 1 in which the tracks are characterized as intentionally overlapped.

The tracks (Tracks 0-3) in FIG. 9 are each sequentially written with an initial width that substantially conforms to the effective operational width of the write element 150. Each subsequent track is intentionally overlapped onto a prior track by a selected amount so that the remaining, non-overlapped portion is sufficiently wide to enable the read element 152 to recover the non-overlapped data.

It will be appreciated that this approach generally increases the overall storage capabilities of the medium 110, since a larger number of data tracks can be formed on a given media surface. Some measure of complexity to the data management system is added, however. For example, if the data written to Track 1 in FIG. 9 needs to be updated, in order to rewrite that data to the same location, it is generally necessary to readback and then sequentially rewrite the associated data on Tracks 2 and 3 as well. That is, in order to write new data to Track 1, the associated contents of Tracks 2 and 3 are cached in the buffer 132. The new data are then written to Track 1 during a first pass of the transducer 112, followed by the sequential rewriting of the data to Tracks 2 and 3 during subsequent passes.

It follows that writing overlapping tracks in this manner generally requires a level of care to ensure that a subsequent track (such as Track 3) does not overlap a previously written track (such as Track 2) by too much, thereby leaving insufficient margin on the non-overlapped portion of the previously written track to allow data recovery. For example, if a write fault threshold event is generated during the writing of data to Track 3 so that Track 2 is excessively overlapped, the device 100 preferably proceeds with an error recovery operation upon the affected data on Track 2, rewrites the data to Track 2, and then restarts the writing of the data to Track 3 at the desired position.

A somewhat different situation may arise, however, if the off-track error occurs in the opposite radial direction. For example, as shown by Track 4 in FIG. 10, an off-track error has occurred in that Track 4 is not sufficiently overlapped onto Track 3. This generally does not present a problem with subsequent recovery efforts upon the data on Track 3; indeed, additional margin has been provided so it will be generally easier to recover the data on Track 3.

However, if Track 5 is written at the originally intended location for that track, it can be seen that Track 4 will not likely be provided with sufficient non-overlapped area to permit the successful recovery of the data on Track 4.

Figure 10:
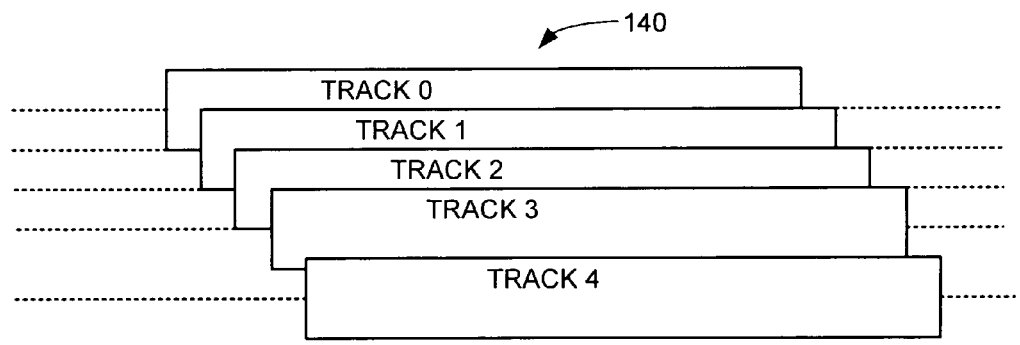
FIG. 10 provides a schematic representation in which position error is encountered when writing data to overlapping tracks such as in FIG. 9.

Accordingly, in response to the off-track error shown in FIG. 10, a write protected status is provided to one or more downstream tracks (or portions thereof) until this error condition is resolved. In some preferred embodiments, the data on Track 4 is left as shown in FIG. 10 until such time that a corrective maintenance action can be executed. Such corrective actions can include the reading and rewriting of Track 4 so that Track 4 is moved up to provide the desired overlap onto Track 3.

Figure 11:
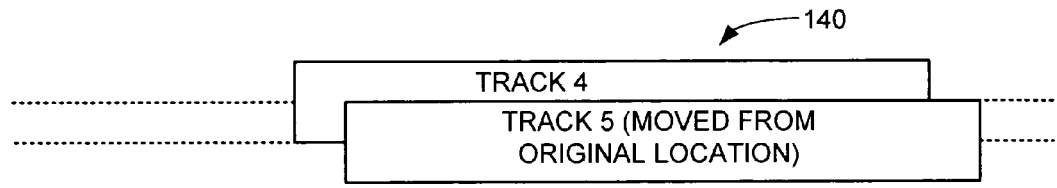
FIGS. 11 and 12 provide alternative corrective resolution approaches that can be taken in accordance with preferred embodiments to resolve the position error of FIG. 10.

Alternatively, Track 4 is left in the radial position shown in FIG. 10 and the subsequent tracks are written at locations so that the desired amount of overlap is restarted for these subsequent tracks. For example, as shown in FIG. 11, Track 5 is moved radially from where it would have been formed previously so that the correct amount of overlap is provided to Track 4. Preferably, the write protected status remains in place for Track 5 (and subsequent tracks) until the servo processor 136 can carry out the necessary adjustments to set the radial addresses of the adjusted tracks, after which this status is removed.

Figure 12:
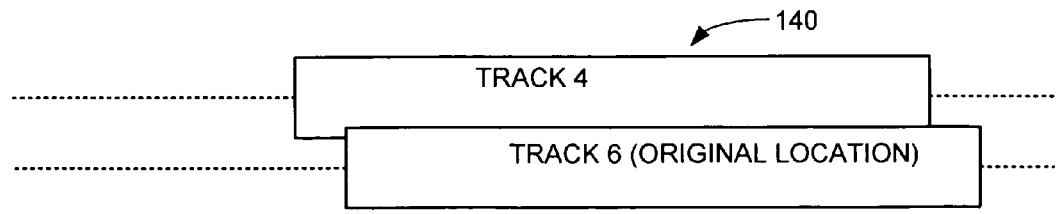

In another alternative approach, Track 4 is left in the radial position shown in FIG. 10 as before, and the servo processor 136 identifies the next track that can be written at its originally intended location. For example, FIG. 12 shows that Track 6 can be written at its originally intended location and provide sufficient margin to permit the data on Track 4 to be recovered. In this case, the area of the medium 110 that was previously allocated to Track 5 is essentially absorbed into Tracks 4 and 6. Track 5 thus becomes lost as a separately addressable track, and thus attains permanent write protected status (e.g., the LBAs intended for Track 5 need be reassigned elsewhere on the medium 110).

Figure 13:
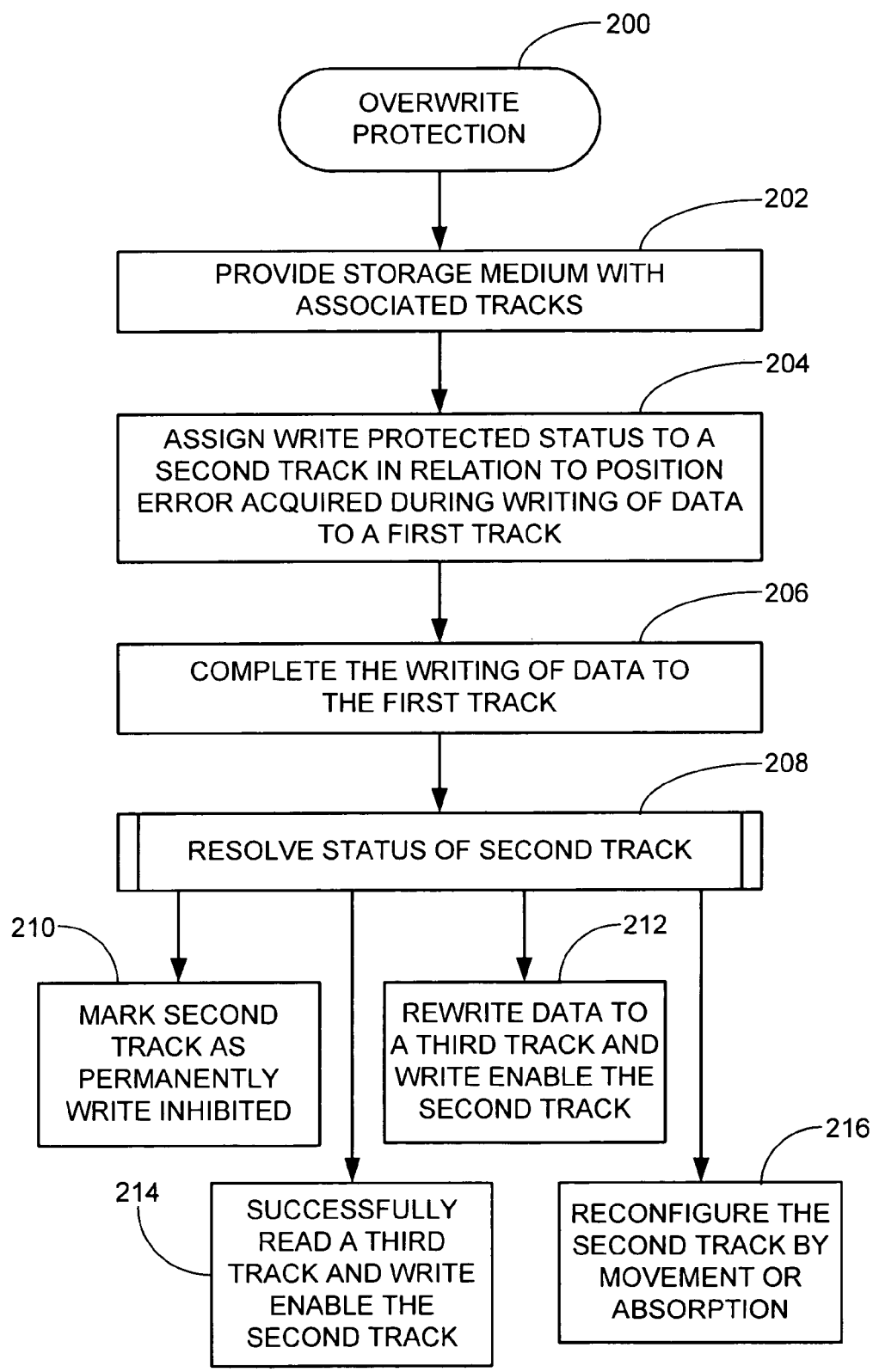
FIG. 13 sets forth an OVERWRITE PROTECTION routine, illustrative of steps carried out in accordance with preferred embodiments of the present invention.

FIG. 13 provides a flow chart for an OVERWRITE PROTECTION routine 200, generally illustrative of steps carried out in accordance with preferred embodiments of the present invention.

At step 202, a storage medium is first provided with associated tracks thereon. These tracks are preferably arranged to include at least first and second tracks, such as Tracks 1 and 3 referred to in FIGS. 5-8 or Tracks 4 and 5 referred to in FIGS. 9-12. As desired, a third (or more) tracks may further be provided between the first and second tracks, such as Track 2 in FIGS. 5-8. Data may or may not have been previously written to any of these tracks.

At step 204, a write protected status is assigned to the second track in response to a position error acquired during the writing of data to the first track. This marking of the second track as being write protected can extend to all, or only some, of the data sectors 144 on the track as desired.

As discussed above, the amount of position error may or may not be sufficient to trigger a write fault and interruption of the writing of the data to the first track. It is contemplated, however, that in many cases the position error threshold will be greater or equal than the write fault threshold. The routine thus preferably continues at step 206 where the data are rewritten (or otherwise successfully written) to the first track.

At step 208, a resolution of the write protected status of the second track is carried out. This can take any number of alternative forms such as, but not limited to, steps 210, 212, 214 and 216. In step 210, the write protected status for the second track is made permanent, such as discussed above in FIG. 7. Step 212 rewrites data on a third track (such as a third track between the first and second tracks) and the second track is write enabled, such as set forth in FIG. 8.

Step 214 reads the data on a third track (such as between the first and second tracks) and, if no errors occur, no rewriting of the data on the third track occurs and the second track is write enabled (alternative to FIG. 7). Step 216 resolves the status of the second track such as by movement (see FIG. 11) or absorption (see FIG. 12).

It will now be appreciated that the various preferred embodiments presented herein provide advantages over the prior art. Write inhibiting one or more tracks other than the track that acquires a write position error advantageously reduces a likelihood that dual-sided track squeeze, or other effects, will reduce the ability to recover data from a medium.

While preferred embodiments discussed above have generally write inhibited tracks that are located in the direction of the position error, such is not necessarily limiting. For example, it may be desirable in some cases to specifically write inhibit tracks in the direction away from the position error, or to write inhibit distal tracks on both sides of the track with the position error.

Moreover, while some preferred embodiments write inhibit a track that is two track spacings away from a first track associated with the position error (e.g., write protecting a second track with a third track disposed between the first and second tracks), this is not limiting. For example, an immediately adjacent track (such as Tracks 4 and 5 discussed in FIGS. 9-12), or a plurality of tracks, may be additionally or alternatively write protected as desired.

For purposes of the appended claims, the recited "first means" will be understood consistent with the foregoing discussion to correspond at least to the disclosed servo circuit 134. The phrase "write protected status" will be construed consistent with the foregoing discussion to require more than a mere interruption of writing in general due to the declaration of a write fault or the like.

While preferred embodiments presented herein have been directed to a disc drive data storage device, it will be appreciated that such is merely for purposes of illustration and is not limiting. Rather, the claimed invention can be utilized in any number of various environments.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A method comprising steps of acquiring a position error during writing of data to a first track, and assigning a write protected status to a third track to inhibit subsequent writing of data thereto in relation to the position error, wherein a second track is disposed between the first and third tracks.

2. The method of claim 1, wherein the position error is characterized as a first position error, and wherein the method further comprises a step of declaring a write fault condition during said writing of data to the first track in relation to a second position error different from the first position error.

3. The method of claim 2, further comprising a step of, after the write fault condition is declared, completing the writing of data to the first track while maintaining the write protected status of the third track.

4. The method of claim 1, further comprising a step of subsequently writing data to a track other than the third track while maintaining the write protected status of the third track.

5. The method of claim 4, further comprising a step of removing the write protected status of the third track after the writing of data to the second track to enable subsequent writing of data to the third track.

6. The method of claim 1, wherein the first, second, and third tracks are characterized as intentionally overlapped tracks.

7. The method of claim 6, further comprising a step of providing a data transducer with separate write and read elements, wherein a radial distance by which said tracks are overlapped are selected in relation to an operational width of the read element.

8. The method of claim 1, wherein the position error is determined in relation to a radial distance between the track and a transducer used to write said data.

9. The method of claim 1, further comprising reallocating data sectors on the third track to a different track so that data previously intended to be stored to the third track are instead stored to said different track.

10. An apparatus comprising a storage medium comprising first, second, and third tracks, and a circuit which assigns a write protected status to the third track to inhibit subsequent writing of data thereto in relation to a position error acquired during writing of data to the first track wherein the second track interposes the first and third tracks.

11. The apparatus of claim 10, wherein the circuit comprises a programmable processor.

12. The apparatus of claim 10, further comprising a data transducer moveable with respect to the medium and configured to write data to the first, second, and third tracks.

13. The apparatus of claim 10, wherein the position error is characterized as a first position error, and wherein the circuit further declares a write fault condition during said writing of data to the first track in relation to a second position error different from the first position error.

14. The apparatus of claim 13, wherein after the write fault condition is declared, the circuit subsequently completes the writing of data to the first track while maintaining the write protected status of the third track.

15. The apparatus of claim 10, wherein the circuit further writes data to the second track while maintaining the write protected status of the third track.

16. The apparatus of claim 10, wherein the circuit subsequently removes the write protected status of the third track to enable subsequent writing of data thereto.

17. The apparatus of claim 10, wherein the first, second, and third tracks are characterized as intentionally overlapped tracks.

18. An apparatus comprising a storage medium comprising first and third tracks, and first means for assigning a write protected status to the third track to inhibit subsequent writing of data thereto in relation to a position error acquired during writing of data to the first track, wherein a second track interposes the first and third tracks.

* * * * *